United States Patent [19]

Hinlein et al.

[11] Patent Number: 4,503,530
[45] Date of Patent: Mar. 5, 1985

[54] DISK HUB SPINDLE SYSTEM

[75] Inventors: Sigmund Hinlein, Sudbury; Shyam C. Parikh, Stow, both of Mass.

[73] Assignee: Digital Equipment Corporation, Maynard, Mass.

[21] Appl. No.: 382,550

[22] Filed: May 27, 1982

[51] Int. Cl.³ .............................. G11B 3/70; G11B 5/82
[52] U.S. Cl. ....................................... 369/270; 369/282; 369/290; 360/86; 360/97
[58] Field of Search ............... 369/270, 271, 292, 261, 369/269, 282, 290; 360/86, 99, 97; 83/665, 666; 403/13, 14, 383, 361, 362

[56] References Cited

U.S. PATENT DOCUMENTS

| | | | |
|---|---|---|---|
| 2,607,616 | 8/1952 | Davidson | 403/361 |
| 3,030,131 | 4/1962 | Scherry | 403/362 |
| 3,801,476 | 4/1974 | Roschmann et al. | 369/282 |
| 4,035,098 | 7/1977 | Griffin | 403/362 |
| 4,166,622 | 9/1979 | Rager | 369/282 |
| 4,306,259 | 12/1981 | Saito | 360/99 |
| 4,358,843 | 11/1982 | Rager | 369/261 |

OTHER PUBLICATIONS

"Bifurcated Hub Key", *IBM Technical Disclosure Bulletin*, Bernard et al., Jun. 1979, vol. 22, No. 1.

*Primary Examiner*—Steven L. Stephan
*Attorney, Agent, or Firm*—Vincenzo D. Pitruzzella

[57] ABSTRACT

A hub and spindle assembly for an interchangeable, removable disk of a disk drive. The spindle assembly includes means for driving the hub assembly, matingly attached and removably engaged thereto, so as to rotate the disk coupled to the hub. The hub assembly includes surfaces for engaging an accurately machined rotational surface of the spindle assembly and force engaging means for ensuring mating contact of the hub assembly surfaces with the spindle assembly and for ensuring removeable engagement. The hub and spindle assembly minimize runout such that the Read/Write heads track an essentially circular disk track, even if the disk is removed, reinserted or placed on a different spindle of the same type.

3 Claims, 6 Drawing Figures

DISK HUB SPINDLE SYSTEM

FIELD OF THE INVENTION

This invention generally relates to disk hub systems and, more particularly, to a spindle and hub for a disk drive with a removable, interchangeable cartridge.

BACKGROUND OF THE INVENTION

Digital systems, such as data processing systems, generally include a secondary storage facility used in conjunction with the data processing unit for the storage and retrieval of data.

Typical secondary storage facilities include direct access memory devices, such as magnetic disks, tapes or drum memories, and newer magnetic bubble memories. All of these devices have a common function, that is, to store data and be capable of retrieving accurately that data for use by the central processing unit. In particular, magnetic disk memories have become the main stay of secondary storage facilities for digital systems and have increased in complexity, density of stored data, performance capabilities and price performance.

The magnetic disk memory system comprises typically a disk drive, including the spindle, motor assembly and means for coupling a magnetic disk cartridge (hereinafter a "disk"), to the spindle for rotation about the spindle axis and magnetic Read/Write head means (hereinafter "heads") for Writing and Reading data onto and off of the magnetic disk. The drive further includes or is coupled to a disk controller, which performs operations in conjunction with or in response to the central processing unit for accessing the drive, positioning the heads, Reading and Writing the data and other functions known in the art with regard to the data and processing thereof.

In general, there are various sizes of drives, presently small 5¼" disks to the large 14" disk, as well as hard and floppy disk media. However, the drives are of generally two types: fixed disk, that is, fixed to the drive or not removable therefrom and removable disk cartridges. The removable disks may be either hard or floppy disks.

With respect to removable disks, a common problem associated with the disk is the interface between the disk hub and the drive spindle assembly along the axis of rotation/symmetry (hereinafter "axis of rotation"). In particular, the mating between the disk hub and the spindle must be accomplished in a relatively accurate, simple manner. It is desirous to position the disk hub on or matingly with the spindle and along the axis of rotation to effect accurate positioning of the head with respect to the disk. Also, accurate alignment of the disk along the spindle's rotational axis is desired such that the axis of rotation of the disk is aligned with the axis of rotation of the spindle. Any offset of the axis of rotation of the disk with respect to the axis of rotation of the spindle is commonly associated with the phenomena called "runout". The runout phenomena is a situation in which the circumferential tracks about the magnetic disk, formed by the head, as the disk rotates, are eccentric, that is, not the expected circular track. The eccentric tracks are difficult to follow during the Read operation, which affects the effective operation of the drive.

Prior art systems for mounting a removable disk, or a plurality thereof, have included means for loading or mounting the disks and to adjust for runout. One such prior art system for a disk 10 is shown in FIG. 1. As shown in FIG. 1, a spindle 12, having an axis of rotation 14, and coupled to the disk drive motor (not shown) for rotation, includes a radially extended surface member 16 fixedly attached to the spindle. The surface member 16 includes a raised surface, or ring member 18, at its outer diameter. The spindle 12 further includes a central conical member 20 for mating attachment to the disk 10, as later described. The spindle 12 further includes a ring magnet 22 used to magnetically attract the disk 10 and to hold it in attachment to the spindle. Generally, the magnet 22 is of sufficient magnetic force to transmit the torque from the rotated spindle to the disk. The disk 10 includes a hub 24, to which the disk cartridge, or platter 26, is attached by a clamp 27. In addition, the hub 24 mates with the spindle 12 to transmit the rotation of the spindle to the platter 26. The hub 24 includes a corresponding mating attaching conical portion 28 to couple to the spindle conical member 20. Because of mating problems associated with conical members and other sections, the hub further includes a flexible member, or diaphragm 30, extending radially from the conical portion 28 and terminating in a ring 32, having a surface 34, for seating on the flat surfaces of the ring member 18.

In operation, the disk hub assembly is mounted onto the spindle and the conical portions 20 and 28 of the spindle and hub respectively matingly contact at a point predetermined within certain accuracy along the conical portion 20. As the hub 24 approaches the spindle, the ring magnet 22 exerts a force on the hub ring 32 and attracts the hub ring 32 into contact with the ring member 18 of the spindle. Because both the spindle and the hub in this type of prior art system must be accurately machined, both along the ring member surfaces, a relatively easy and not excessively costly problem, but also, along the conical positions, a considerably more difficult and costly procedure, there is a substantial cost in this type of alignment system. In addition, as it is extremely difficult and generally impractical to accurately machine and mating conical portions 20 and 28 of the spindle and hub, respectively, and the mating portions 18 and 32 of the spindle and hub rings, respectively, such that all respective portions contact at predetermined locations, the attraction of ring magnet 22 on the hub 22 causes a flexure of the flexible diaphragm 30 in order that the hub mates with the spindle. Flexure in this system, however, leads to various runout problems. The difficulty in machining the conical portions in a mating fashion creates offsets in the axis of rotation of both the spindle and the hub such that a runout can be expected. In addition, the ring portions of the hub and spindle may contact in a skewed or offset orientation from the axis of symmetry. As the ring magnet is of sufficient magnetic strength/capability to transmit the torque to the hub disk assembly, the magnetic attraction force of the magnet could attract the nearest ring portion of the hub in contact with the ring of the spindle angularly skewing the hub to the spindle. This situation would angularly position the conical portion of the hub onto the spindle conical portion relative to the axis of rotation. Accordingly, various runout problems are encountered with this type of system, resulting in eccentric tracks, that is, eccentric tracks are Written and Read onto the disk and off the disk by the Read/Write heads. Moreover, when the disk is removed and then reinserted onto the same spindle, or onto another spindle, the skew or offset resulting in the first set of runout conditions generally changes. When a new runout occurs with different offsets, the tracks which the heads are attempting to Read and Write upon, are not aligned with the original eccentric tracks of the previous spindle. In this manner, the Read/Write heads of disk drives have considerable difficulty in following the tracks. As such, the Read/Write heads require expensive, sophisticated servo techniques for adjusting the heads with respect to the tracks.

Accordingly, it is desirous to have a spindle/hub assembly which will accurately and repeatedly mate with one another such that runout is minimized, or is effectively eliminated. It is further desirous to have a hub spindle assembly which is not affected by removal and reinsertion into a particular spindle, or any similar spindles, but which will present the same tracks to the heads. In addition, it is desirous to have the tracks Written by the heads in a circular manner with respect to the axis of rotation/symmetry of the spindle in all cases of spindle/hub assembly. In this manner, hub interchangeability is accomplished, track following is ensured, and runout with respect to the axis of rotation, or with respect to the heads, is essentially eliminated.

SUMMARY OF THE INVENTION

In accordance with this invention, the spindle and hub assembly for a removable, interchangeable disk is provided. The spindle and hub assembly for a removable, interchangeable disk includes means for accurately aligning the hub, or the disk attached thereto, along the axis of rotation of the spindle. The spindle/hub assembly further includes means for removably and interchangeably positioning the disk on any spindle of the type disclosed. The disk hub assembly of this invention repeatably seats on any spindle of the type disclosed and in the same position with respect to the axis of rotation such that runout is minimized, or essentially eliminated, and new eccentricities associated in the prior art with different spindles, or reinsertion on the same spindle, are eliminated.

The spindle/hub assembly of this invention includes means for positioning the disk hub along the axis of rotation and means for positioning the disk hub radially with respect to the axis of symmetry in a manner to minimize runout. The invention further includes means for accurately positioning the hub with respect to the radial position of the axis of rotation, such means including accurate portions of the spindle and mating portions of the hub, including a moveable member capable of exerting a force against the spindle member. The invention further includes means for transmitting the rotational torque from the spindle to the hub disk assembly.

Specifically, the spindle/hub assembly, according to this invention, comprises first and second members. The first member includes a recess, or means defining an opening therein, for receiving the second member. The second member, moreover, includes a cylindrical surface of rotation about the spindle/hub assembly axis for removable engagement with the first member. The first member further includes bias means and at least one contact surface for engaging said cylindrical surface of the second member to ensure repeatable mating/engagement between the first and second members for each removal or dis-engagement and re-engagement/mating thereof.

More specifically, a further embodiment of this invention includes slot means, in said cylindrical surface, for engagement with the bias means. The bias means, in the preferred embodiment, includes a spring-activated plunger, designed to engage the slots, to transmit rotational torque from one member to the other member.

This invention is pointed out with particularly in the appended claims. The advantages of the invention may be better understood by referring to the following detailed description and the accompanying drawings.

DETAILED DESCRIPTION OF AN ILLUSTRATIVE EMBODIMENT

For a more complete appreciation of the invention, attention is invited to the following description of the illustrative embodiments of the invention, as shown in the attached drawings.

Figure 1:
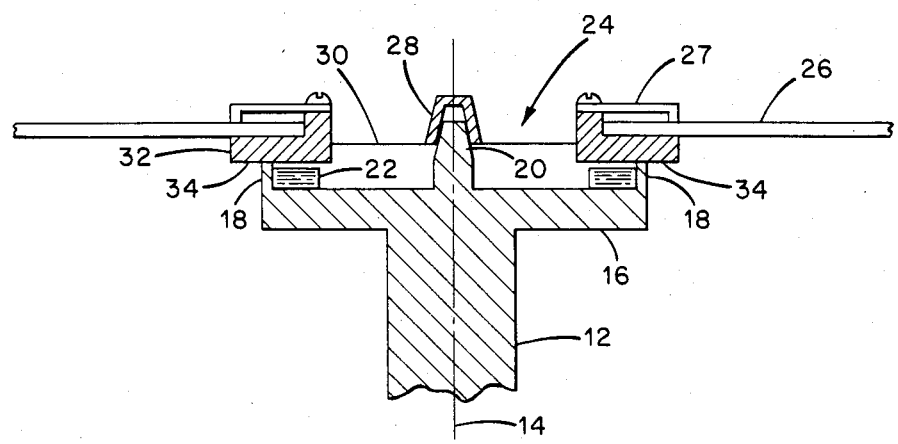
FIG. 1 is a diagramatic illustration of a prior art hub and spindle system, as described.
Figure 2:
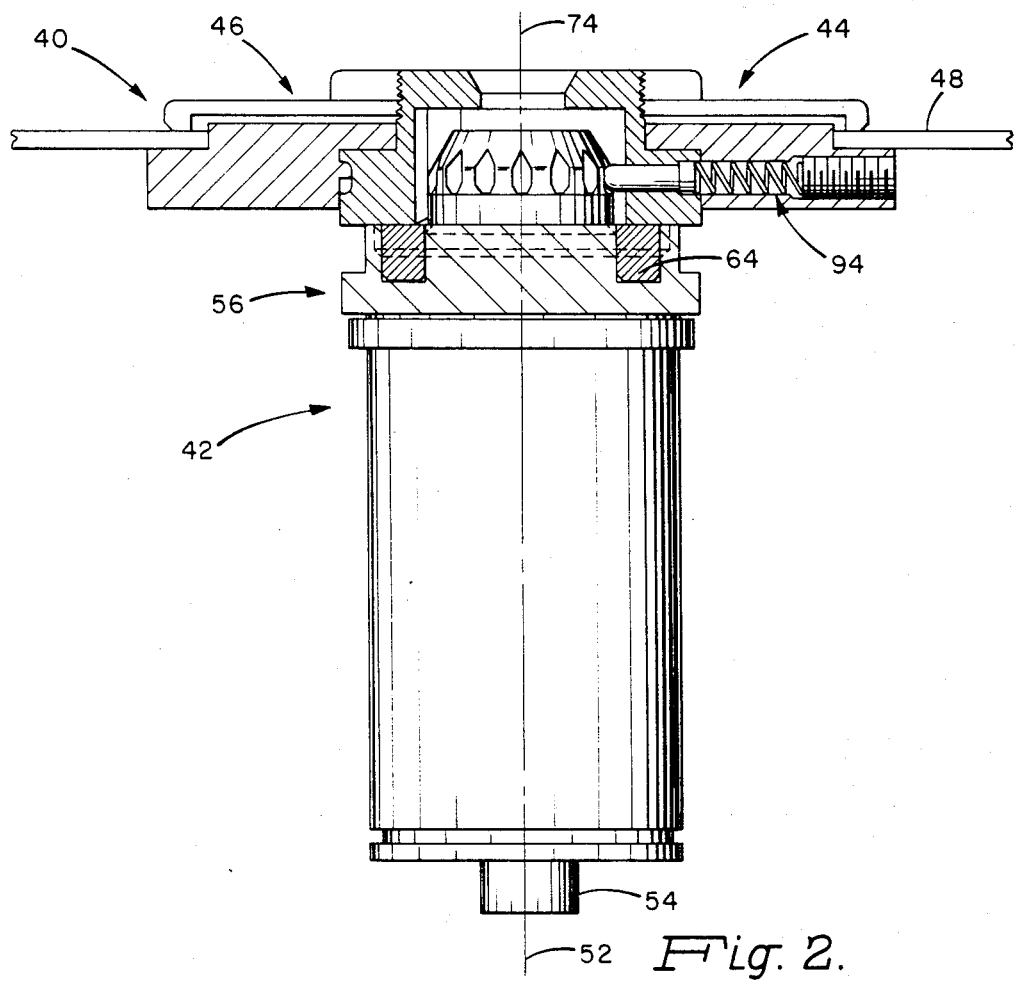
FIG. 2 is an illustration of the spindle/hub assembly in operative relationship, partially in section.

As illustrated in FIG. 2, the spindle/hub assembly 40 (partially in section) includes a spindle assembly 42 and a hub assembly 44, operatively coupled in accordance with this invention and as hereinafter described. The hub assembly 44, further described herein, includes means 46 to couple a disk 48 thereto.

Figure 3A:
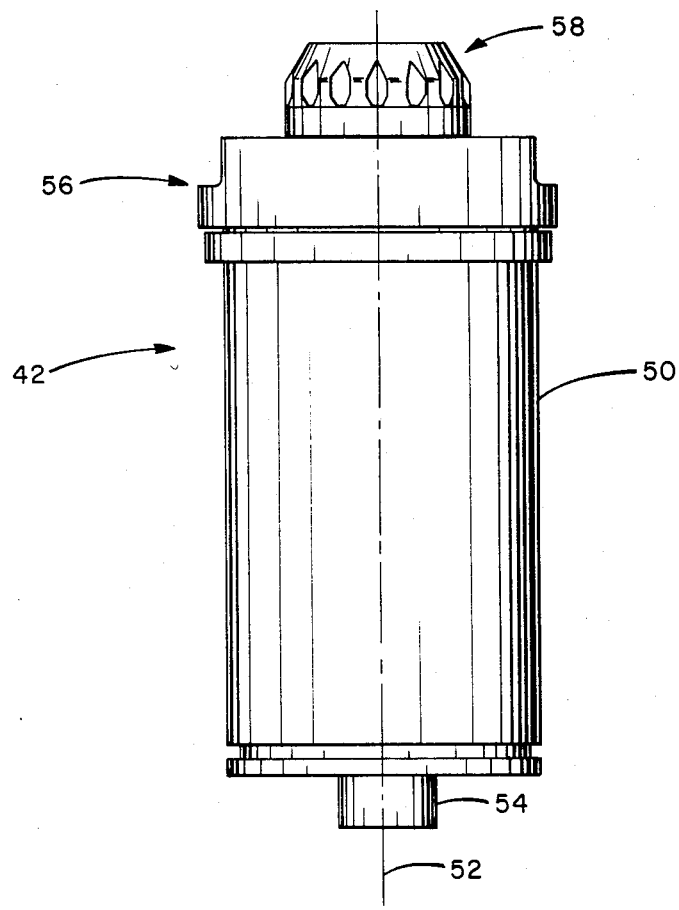
FIGS. 3A and 3B are illustrative embodiments of the spindle assembly of this invention.
Figure 3B:
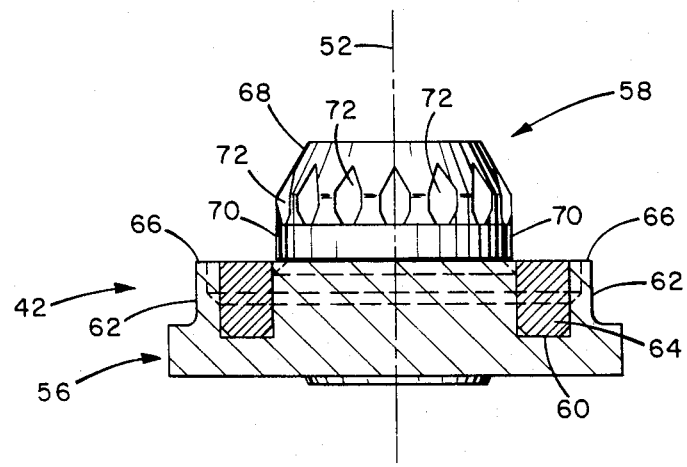

Referring now to FIGS. 3A and 3B, the spindle assembly 42 is more clearly shown. The spindle assembly 42 includes a spindle 50, generally comprising a cylindrical body of revolution about an axis 52, also being the axis of rotation. The spindle 50 includes means 54 for coupling to the disk drive motor (not shown) for rotation of those portions of the spindle 56 which transmit the rotation to the disk 48 (FIG. 2) through the hub assembly 44 (FIG. 2). The spindle means 54 for coupling to the motor is attached for rotation to the spindle rotating portion 56 for rotation through appropriate bearings (not shown), as is well known in the art. The spindle rotating portion 56 includes a spindle nose portion 58 for coupling or mating to the hub assembly 44 (FIG. 2).

Referring now to FIG. 3B, which is shown at an increased scale for clarity, the spindle rotating portion 56 includes a generally cylindrical ring-shaped depression portion 60, recesssed within the rotational portion 56. The cylindrical ring depression 60 and the outer cylindrical material of spindle rotating portion 56 form a ring 62 about the axis of rotation 52. The recessed portion 60 is adapted to receive a ring-shaped magnet 64 within the recess. In general, the magnet 64 will have an axis of magnetization substantially parallel to the axis of rotation 52.

The ring 62 includes a flat top surface 66, accurately machined, preferably ground, for receiving the hub assembly 44 thereon. Accurate machining of this surface 66 and respective surfaces of the hub assembly, hereinafter described, will ensure accurate positioning of the hub assembly along the axis of rotation 52. In this manner, the disk 48, attached to the hub assembly 44, will be accurately positioned in a plan perpendicular to and along the axis of rotation 52 and will ensure accurate positioning of the Read/Write heads (not shown) with respecct to the disk surface.

The spindle nose portion 58, attached to the spindle rotating portion 56, and rotationally coupled therewith, includes a conical surface 68 and, more particularly and more relevant to the invention, an accurately machined cylindrical surface 70. As shown, the accurately machined cylindrical surface 70 is adapted to accurately align the hub assembly 44 with respect to the axis of rotation 52.

The conical surface 68 of the spindle nose portion 58 is provided for ease of insertion of the spindle nose portion 58 into the hub assembly (FIG. 2). That is, the conical portions (there being a conical portion on the corresponding mating portion of the hub assembly, as hereinafter described) allow for mismatch of positioning of the hub and spindle assemblies during insertion thereof, such that the hub assembly may be positioned and aligned along the spindle nose portion 58 with relative ease. As may be readily understood, if the hub assembly 44 included square-edged cylindrical body portions and the spindle nose portion 58 also included square-edged cylindrical body portions, a slight mismatch of the hub assembly to the spindle nose portion 58 could result in abutting contact of the hub and spindle surfaces.

As may be understood from the description of the invention hereinafter, accurate machining of the cylindrical surface 70 of the spindle nose portion 58 is provided in order to accurately and repeatedly position the hub assembly 44 to the spindle assembly 42. Furthermore, as hereinafter described, the accurate machining of the cylindrical surface 70 of the spindle nose portion 58 may be performed/accomplished after assembly of the spindle nose portion 58 to the spindle assembly 42 such that the spindle bearings (not shown) provide accurate rotation during machining of the cylindrical surface 70 with respect to the axis of rotation 52. In this manner, the accuracy of the cylindrical surface 70, with respect to the axis of rotation 52, is ensured.

The spindle nose portion 58 further includes generally axially aligned slots 72 formed in the nose portion and, as shown in this embodiment, the slots extend from the accurately machined cylindrical surface 70 into the conical surface 68. The purposes of these slots 72 will be explained hereinafter.

Figure 4A:
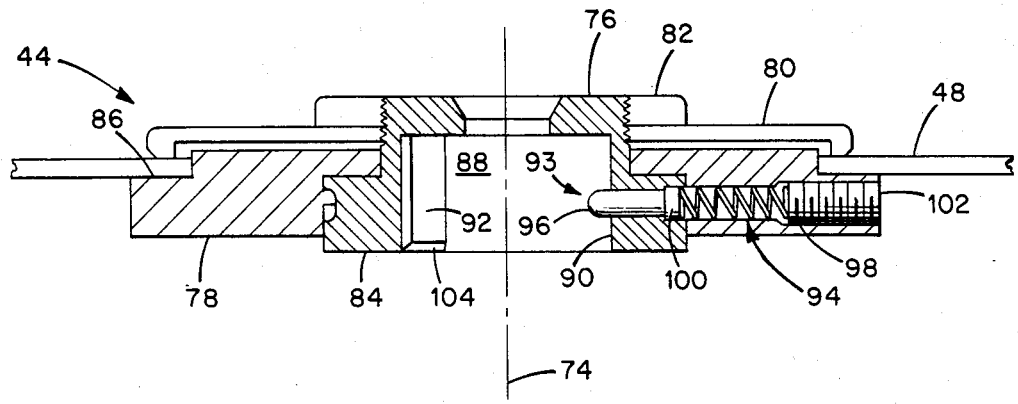
FIGS. 4A and 4B are illustrative embodiments of the hub assembly of this invention.
Figure 4B:
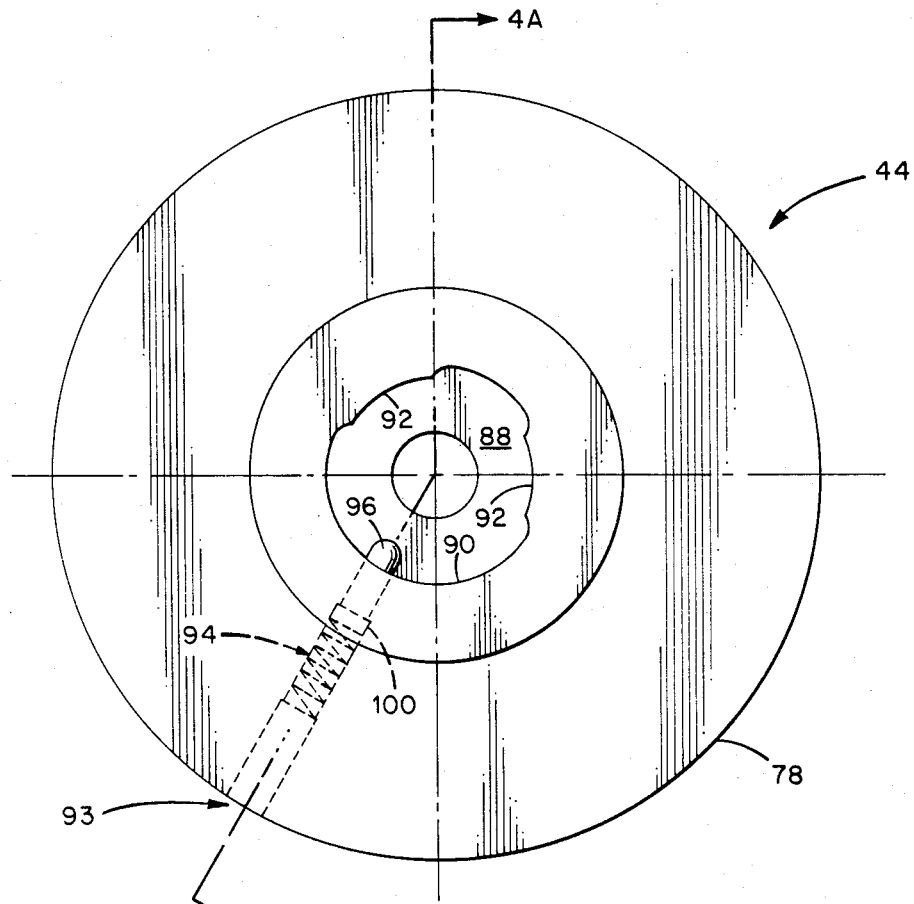

Now referring to FIGS. 4A and 4B, the hub assembly 44 of this invention is shown having an axis of symmetry 74, which becomes aligned with spindle assembly 42 axis 52 during assembly of the hub assembly onto the spindle assembly (FIG. 2). Specifically, the hub assembly 44 is a body of revolution and comprises a first body portion 76 for mating attachment to the spindle nose portion 58. The hub assembly 44 further includes a second body portion 78, which may be a separate and different material from the first portion 76. The second portion 78 is adapted to receive the disk 48, which is held in place, in this embodiment, by a clamp 80 and a nut 82, coupled by mating threads to the hub assembly 44.

The first body portion 76 of the hub assembly 44 includes a machined surface 84 for accurate positioning on the cylindrical ring 62 of the spindle nose portion 58. It may be readily seen that accurate positioning of the disk 48, along the axis 52 or 74, may be accomplished by accurate machining of the surface 84 and positioning the disk on an appropriate surface 86, in this case on the second body portion 78.

The first body portion 76 further includes a receptacle, or opening 88, of general cylindrical shape, as defined by surface 90, into which the spindle nose portion 58 may be inserted. The first body portion 76, and specifically the recepticle 88, further includes surface portions 92 extending from the surface 90 inwardly towards the axis of symmetry 74. Hereinafter, these surface portions 92 will be called "flats", but in reality are curvilinear surfaces, for purposes hereinafter described. As shown in FIG. 4B, which is a bottom view of the hub assembly 44, the flats 92 are spaced angularly about the axis 72, and for purposes of symmetry are spaced 120° from one another. Included within the hub assembly 44 is a centering means, or bias means, assembly 93, mounted in the hub assembly, for centering purposes, hereinafter described. In the specific embodiment, shown in the figures, the bias means is a plunger assembly 94, disposed in appropriate openings or holes within the hub assembly. As shown in the embodiment depicted in FIGS. 4A and 4B, the plunger assembly 94 extends within both the first body portion 76 and the second body portion 78.

The plunger assembly 94 includes a plunger 96 and a spring 98 for providing bias means to the plunger and directing the plunger inwardly into the opening 88. The plunger includes a shoulder means 100 for contacting the shoulder abutting means within the holes of the hub assembly (in this embodiment, the hole for receiving the plunger is of smaller diameter than the hole of the spring such that the plunger shoulder, after full extension of the plunger into the opening 88, abuts the surface defining the smaller diameter hole of the plunger). In this way, over-extension of the plunger 96 into the recess 88 is prevented. The plunger assembly 94 is held in the hub assembly 44 by any appropriate means, such as a screw 102. In the embodiment disclosed in FIGS. 4A and 4B, the plunger assembly 94 is spaced 120° from the flats 92 for symmetry purposes.

As will now be described, the hub assembly 44 may be inserted or mated with the spindle nose portion 58 and accurately and repeatably positioned with respect to the axis of rotation 52. As was expressed above, the position of the disk along the axis 52 may be accurately defined by means of accurately machining the flat surface portions 66 of the spindle assembly and the machined surface portion 84 of the hub assembly. In addition, with respect to the axis of rotation 52, the hub assembly 44 may be accurately aligned, co-axially therewith, such as to minimize rounout by means of the flats 92 and the plunger assembly 94, as hereinafter described. The recess 88 is of sufficient diameter such that positioning the hub assembly 44 and, specifically, the recess 88, onto the spindle nose portion 58 may be accomplished without interference. As indicated earlier, conical surface 68 is provided on the spindle nose portion 58 and likewise a conical corner 104 may be provided on the flats 92, as shown in FIG. 4A. In this manner, the spindle and hub assemblies 42 and 44 may be located and positioned one to another without encountering butting corners to interfere with the mating of the assemblies. Once the hub assembly 44 is disposed onto the spindle assembly, or in mating relationship with the spindle nose portion 58, the invention herein described accurately and repeatably positions the hub assembly with respect to the axis of rotation 52. That is, upon mating attachment of the hub assembly to the spindle assembly, the plunger 96, which extends into the recess 88, sufficiently to encounter or contact the spindle nose portion 58, rides against the accurately machined cylindrical surface 70 of the spindle nose portion 58. The spring 98, moreover, exerts a force through the plunger on the hub and forces the flats 92 into contact with the accurately machined cylindrical portion 70. Accordingly, the plunger 96 effects a force by means of the spring 98 to accurately locate the flats 92, as well as the plunger, against the accurately machined cylindrical portion 70 of the spindle nose portion 58. The plunger 96 and the flats 92 effect a three-point contact to the machine surface 70. That is, the two flats 92 and the plunger 96, by effecting a three-point contact, accurately position the hub assembly on the spindle assembly 42. For symmetry purposes, it was explained that the flats 92 and the plunger 96 are spaced 120° apart, but any suitable contact around the axis 52 may be used. As can be readily understood, repeatability of this accurate positioning is readily accomplished on any similarly designed accurately formed spindle cylinder nose surface portion 70. Repeatability on the same spindle is likewise ensured because the flats 92 will be forced by the plunger 96 against the accurately machined cylindrical surface 70 for all mating contacts, no matter what angular position the spindle assembly 42 may have with respect to the hub assembly 44. It should be noted that a substantial savings in cost and design is accomplished herein in that the prior art included accurate machining of the mating hub and spindle conical (mating) portions, wherein the invention disclosed requires accurate machining cost associated with the spindle assembly 42, a cost also associated with the prior art. Furthermore, the flats 92 and plunger assembly 94 accomplish the accurate and repeatable positioning of the hub with respect to the axis of rotation 52, not found/provided in prior systems.

A unique feature of this spindle/hub assembly is that the accurate positioning of the hub assembly 44, with respect to the axis of rotation 52, ensures that the Read/Write tracks along the disk 48, upon which the Read/Write heads Write and Read data, are essentially circular and repeatably encountered by the heads during interchange from spindle to spindle or during removal and reinsertion on the same spindle. That is, because of the machined accuracy of the cylindrical nose surface 70, with respect to the axis of rotation 52, and the positioning of the hub assembly therewith, the Read/Write heads will essentially Write on the disk 48 a circular track about the axis of rotation 52. Of course, a slight runout, that is, offset in the direction perpendicular to the axis of rotation 52, may occur such that the tracks may be slightly eccentric with respect to the rotation of the disk itself. However, as the hub assembly 44 is matingly coupled to the spindle nose portion 58 and, specifically, to the accurate machined surface portion 70, the eccentric disk tracks with respect to the disk are, in fact, circular with respect to the spindle assembly 42 and, more importantly, with respect to the Read/Write heads.

It should be noted that the spring 98 of the plunger assembly 94 should be of sufficient spring force to accurately position the plunger 96 and the flats 92 against the accurately machined cylindrical surface 70 of the spindle nose portion 58. However, the spring constant should not be of such sufficient value such that the spring force prevents the positioning or removal of the hub assembly 44 onto or from the spindle assembly 42. That is, an excessive force would prevent the movement of the plunger 96 such as to prevent the insertion or removal of the hub assembly 44 from the spindle nose portion 58, as the plunger 96 would not move along its axis but, rather, would hold firm its position and prevent mating.

As indicated hereinabove, the invention herein described accurately locates the hub assembly with respect to the axis of rotation 52 such that runout is minimized and essentially eliminated. In addition, the Read/Write heads Write and Read on essentially a circular disk track with respect to the axis of rotation 52.

It may be noted at this point that the ring magnet 64, FIG. 3B, is employed in this system to hold the hub assembly in axial alignment with the spindle assembly 42. That is, the first body portion 76 should be a magnetically affected material. Furthermore, the ring magnet 64 may be of sufficient magnetic force to transmit, as in the prior arts systems, the motor torque from the spindle assembly 42 to the hub assembly 44, thereby rotating the disk. However, as a further feature of this invention, it was noted hereinabove that numerous slots 72 were employed in the spindle nose portion 58. These slots 72 extend sufficiently axially along the direction of the axis 52 on the cylinder surface 70, such that the plunger 96 may engage an oppositely disposed slot 72. The plunger 96 is, accordingly, designed to engage the slots 72. By engaging a slot 72, the plunger 96 is "captured" within the confines or wall portions of the slot such that the torque supplied by the motor, coupled to the spindle nose portion 58, is transmitted through the plunger 96 to the hub assembly, thereby rotating the hub assembly and associated disk. It is apparent that the spring 98 must exert sufficient force, as hereinabove indicated, but, in order to ensure ease or mating, insertion and withdrawal of the hub assembly, the slots 72 are tapered along the axial dimension, but employ radially deep, straight wall portions to "capture" the plunger 96. In this manner, a direct coupling between the motor, spindle, and hub assembly may be accomplished and magnets 64 of lesser magnetic force need be employed. Although this direct coupling is not necessarily needed for the invention, the preferred embodiment of this invention has employed the slots 72 and the direct coupling through the plunger 96.

What we claim as new and desire to secure by Letters Patent of the United States is:

1. An arrangement for mounting a data recording hub assembly, which includes a data recording disk on a rotatable spindle comprising in combination:

rotatable spindle means having an axis of rotation and having a top section whose upper portion is formed to be conical in shape and whose lower portion is formed to have an outer surface which lies parallel to said axis of rotation and which is characterized by being an accurately machined surface; said rotatable spindle means further formed to provide a shoulder section extending from said lower portion of said top section, said shoulder section formed to support and secure a hub assembly so that if said rotatable spindle means rotates it will cause said hub assembly to rotate; hub assembly means formed to have a mounting aperture therein, said mounting aperture having an inside wall with the periphery thereof formed to provide first and second alignment segments disposed apart from one another, said mounting aperture being further formed to have a depth dimension which is greater than the distance from said shoulder section to the top of said top section whereby when said hub is fitted over said top section said mounting aperture accepts said top section completely and said first and second alignment segments come into abutment with said accurately machined outer surface thereby providing two points of alignment between said hub assembly and said rotating spindle; a plurality of alignment apertures formed in said top section and disposed to be part in said lower portion and part in said upper portion; spring loaded bias means disposed in said hub assembly and adapted to be inserted in any of said alignment apertures to exert a force against said rotatable spindle thereby providing a third point of alignment with said first and second alignment segments whereby said hub assembly can be accurately aligned with said rotatable spindle in any of a plurality of positions around said rotatable spindle.

2. An arrangement for mounting a data recording hub assembly according to claim 1, wherein magnetic means are disposed in said shoulder section whereby said hub is magnetically clamped to said shoulder section.

3. An arrangement for mounting a data recording hub assembly according to claim 1, wherein said first and second alignment segments of said hub is each a protrusion shaped segment formed to come into abutment with said accurately machined outer surface of said lower portion of said top section.

* * * * *